Sept. 27, 1960
H. WIEBEN
2,954,242
HITCH FOR VEHICLES
Filed Dec. 12, 1958
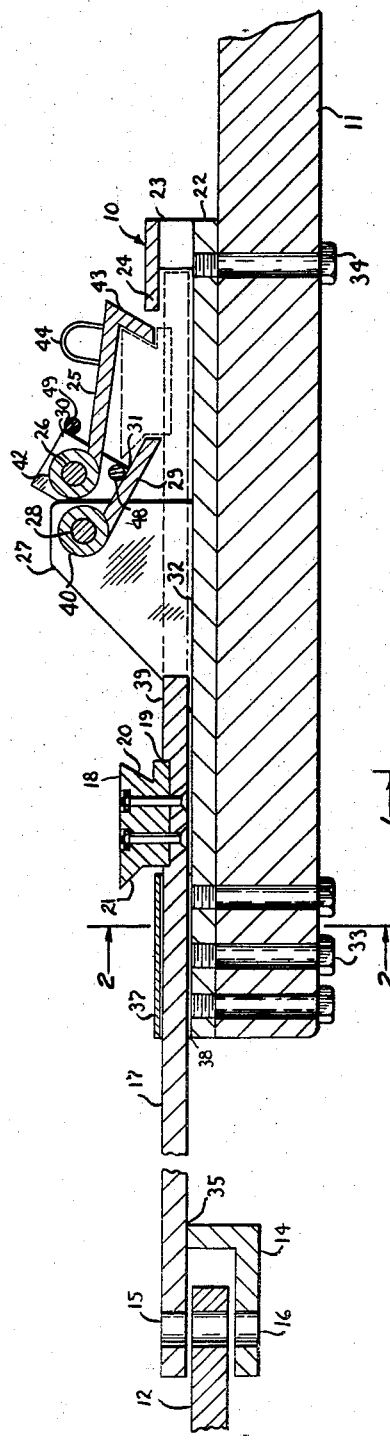
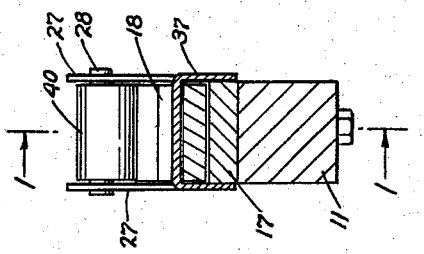
INVENTOR.
HAROLD WIEBEN
BY
Charles L. Lovercheck
ATTORNEY

United States Patent Office 2,954,242
Patented Sept. 27, 1960

2,954,242
HITCH FOR VEHICLES
Harold Wieben, Reinbeck, Iowa
Filed Dec. 12, 1958, Ser. No. 780,006
10 Claims. (Cl. 280—482)

This invention relates to hitches and, more particularly, to hitches for towed vehicles.

In the use of farm machinery wherein a tractor is provided for towing vehicles which must be connected to various vehicles and disconnected therefrom at frequent intervals, it is desirable to have a hitch which can be extended during the connecting operation of the tractor to the vehicle if the tractor is not at an exact spacing from the vehicle required, to eliminate the need for precisely spacing it. In order to provide such a hitch, it has been found desirable to have a telescoping hitch which can be extended during the coupling operation. Then by backing the tractor, the hitch may be locked in a fixed position for towing.

Various ways of connecting the hitch in fixed position have been proposed but none of them have been completely satisfactory in that they cannot be disconnected rapidly and are not positive in their locking action.

It is, accordingly, an object of this invention to overcome the defects and disadvantages in prior hitches and, more particularly, it is an object of this invention to provide a hitch which is simple in construction, economical to manufacture, and simple and efficient in operation.

Another object of the invention is to provide an extensible hitch for a towed vehicle wherein the extensible device is positively locked in unextended position.

Another object of the invention is to provide an extensible hitch which will automatically lock in unextended position when the towing vehicle is backed.

A further object of the invention is to provide an improved extensible hitch which will operate even though the hitch is not locked in unextended position while the towed vehicle is towed.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a cross sectional view taken on line 1—1 of Fig. 2 of a hitch according to the invention; and Fig. 2 is a cross sectional view taken on line 2—2 of Fig. 1.

Now with more specific reference to the drawing, a hitch 10 is shown supported on a wagon tongue or tongue of a towed vehicle 11. The hitch 10 is shown connected to a draw bar 12 of a towing vehicle by means of a bolt which may be disposed in holes 15 and 16 in a sliding bar 17. The sliding bar 17 has a clevis 14 welded thereto at 35 and extends downwardly and then forwardly under the draw bar 12 so that the hole 16 therein lines up with the hole 15 and both may be caused to register with the hole in the draw bar 12.

A fixed bar 22 is attached to the tongue of the vehicle 11 by means of bolts 33 and 34 which are disposed in bored holes in the tongue and threadably engage holes in the fixed bar 22. The fixed bar 22 has a hitch guide 37 which is generally U-shaped and attached by each of its legs at 38 to the fixed bar 22 by welding or other well known fastening means. The hitch guide 37 forms a sliding guide for the sliding bar 17. The fixed bar 22 has a stop 23 welded thereto. The stop 23 is generally U-shaped with the ends of its legs welded to the fixed bar 22 and its intermediate portion extending and overlying the fixed bar 22 in spaced relation thereto to receive a rear end 39 of the sliding bar 17.

Upright ears 27 are welded to each side of the fixed bar 22 at 32 and they receive the sliding bar 17 therebetween. The upright ears 27 have pins 28 attached thereto and extending therebetween and the ears 27 receive an eye 40 of a latch lever 29 therebetween. The latch lever 29 is attached to the eye 40 and swings about the pins 28 and the lower end thereof is received in the cleft below a forwardly sloping lip 21 of a lug 18 when the hitch 10 is in an unextended position as shown in dotted lines.

The lug 18 is disposed in a recess 19 in the sliding bar 17 and is attached therein by bolts so that it can be removed to disassemble the device. The lug 18 has a groove 20 in the rear edge thereof which is defined by a horizontal side and an upwardly and rearwardly sloping side defining an angle of approximately sixty-four degrees therebetween so that a latch block 25 can swing therearound without interference.

Latch ears 30 are welded to the latch lever 29 at 31 and have a pin 26 extending therebetween. The pin 26 is received in an eye 42 of the latch block 25 and the rear end of the latch block 25 has a downwardly and forwardly extending flange 43 thereon which is received in the groove 20 when the hitch 10 is in the retracted position. It will be noted that in its extreme forward position, the sliding bar 17 is still between the upright ears 27.

In use, when the vehicle having the tongue is unattached to a towing vehicle, a handle 44 is grasped by the operator and the latch block 25 is thereby swung to bring the flange 43 out of engagement with the groove 20. Then the sliding bar 17 is slid rearwardly and the latch lever 29 is swung out from under the sloping lip 21. A stop 48 is welded to the latch lever 29. This will engage the block 25 and swing it up against a stop 49. The stop 49 is welded at its ends to the latch ears 30 to limit the upward travel of the latch block 25.

After the block 25 and the latch lever 29 have been swung upwardly, the sliding bar 17 can be moved forward the required distance to cause the holes 15 and 16 to register with the hole in the draw bar 12. A pin is then placed in the holes 15 and 16 and the towed vehicle is thus coupled to the tractor. The tractor can then be backed the required distance to cause the end 39 to engage the latch lever 29 to swing it up and thus allow the end 39 to move under a channel 24. As the sliding bar 17 slides, it engages and raises the latch lever 29 and the latch block 25. When the lug 18 passes below the latch block 25, the latch lever 29 will then drop down into the space forward of the sloping lip 29 and as the vehicle is then pulled forward, the latch block 25 will swing down to bring the flange 43 thereof into the groove 20 and allow the flange 43 to rest on the lug 18.

The stop 48 is welded on where indicated to raise the latch block 25 to clear the lug 18 and place the latch block 25 on top of the lug 18 when the latch lever 29 drops in front of the lug 18, thereby placing the latch block 25 in position to drop behind the lug 18 when the sliding bar 17 is moved forward until the lug 18 contacts the latch lever 29, allowing the latch block 25 to latch or drop. It will be noted that the rear face of the latch block 25 is tapered so that it will automatically slide over the lug 18 when the vehicle is backed. Since the front edge of the channel 24 is about an inch rearward of the lug 18 when it is in the latched position shown, when it is unlatched, the hitch has about an inch of rearward travel from the latched position. This gives the extension hitch both forward and rearward travel from the latched position which is advantageous in coupling and uncoupling vehicles.

It will be noted that the hitch disclosed is a self-contained unit and is not dependent upon any particular type of tongue, vehicle, or draw bar to function properly. The construction of the latch lever and the latch block in the manner shown creates a minimum resistance for latching and a maximum of resistance for unlatching. No springs are necessary in the upright and the spaced ears perform three duties:

(1) They are the pivot of the anchor point for the latch block;

(2) As wear occurs on the pin of the latch lever and the holes in the ears wear, the pressure of the towing vehicle will be transferred to the ears 30; and (3) When the latch lever 29 is raised, it will be stopped by the uprights welded to the latch block 25 coming into contact with the ears welded to the fixed bar 22, thus limiting the rotation of the latch lever 29.

The stop 49 is needed to limit the upward travel of the latch block 25. By limiting the movement of the latches in this manner, the mechanical working of the latches is very accurate, fast, and positive.

An important feature of the hitch 10 is the groove 20. In order for the groove to function properly so that the latch block 25 will not be disturbed when the vehicle travels over rough ground, the groove 20 must be formed at an angle of less than ninety degrees to the horizontal. It has been discovered through experiment that an angle of sixty-four degrees to the horizontal is optimum. This is important only when rearward pressure is applied to the latch block 25. This angle on the groove 20 prevents the latch block 25 from raising by applied pressures. The angle must be less than the angle created by the arc of the latch block 25 being raised and lowered.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A hitch comprising a fixed bar adapted to be attached to a vehicle to be towed, a U-shaped hitch guide attached to said fixed bar and defining a guide passage, spaced ears attached to said fixed bar, a sliding bar having means on one end thereof for attaching it to a tractor and a lug on one side of the other end, said sliding bar being received in said hitch guide and slidable between said ears, a latch disposed between said ears and attached thereto and swingable thereon into engagement with the side of said lug adjacent to said means for attaching it to a tractor, and means swingably attached to said latch to engage the opposite side of said lug from said latch engaged side while said latch is in engagement with said latch engaged side.

2. The hitch recited in claim 1 wherein said means to engage the opposite side of said lug from said latch engaged side comprises a latch block swingably attached to said latch, a downwardly and forwardly extending flange on said latch block, and a groove in the rear edge of said lug, said latch block swinging over said lug to bring said flange into said groove when said latch engages the front side of said lug.

3. The hitch recited in claim 2 wherein said latch block is attached to said latch by means of spaced upstanding ears on said latch, an eye on said latch block, and a pin extending through said upstanding ears and said latch block.

4. A hitch comprising a fixed bar to be attached to the tongue of a vehicle to be towed, a slidable bar to be attached to a towing vehicle, said slidable bar being slidable from an extended position to a retracted position, means at the front of said fixed bar to restrain said slidable bar to slide in engagement with said fixed bar, latch means to lock said slidable bar in retracted position, means to lock said latch means whereby said latch means cannot be unlocked until said means to lock said latch means is unlocked, said latch means comprising a lug attached to the top of said slidable bar, a lip on the front of said lug, a groove on the rear of said lug, a latch swingably attached to said fixed bar and overlying said slidable bar and swingable to bring its distal end into engagement with said lug below said lip, a stop on said fixed bar limiting the rearward sliding movement of said slidable bar, and a latch block comprising a lever attached to the upper side of said latch and extending downwardly and rearwardly therefrom, said latch block swingable over said lug to bring a flange thereon into engagement with said groove on the rear of said lug, the upper edge of said groove sloping downwardly and forwardly at an angle of approximately sixty-four degrees.

5. The hitch recited in claim 4 wherein said latch block is attached to said latch by means of spaced ears on said latch, an eye in said latch block, and a pin extending through said ears and said eye.

6. The hitch recited in claim 4 wherein said latch is attached to said fixed bar by means of spaced ears attached to opposite sides of said fixed bar and forming a guide for said slidable bar, said latch being swingably attached to the upper ends of said ears on said bar, and said stop has a portion overlying the rear end of said slidable bar when it is in its retracted position.

7. The hitch recited in claim 6 wherein said slidable bar is movable rearwardly of its latched position a substantial distance prior to the latching of said latch block.

8. The hitch recited in claim 7 wherein means is attached to said spaced ears on said latch to limit the swinging movement of said latch block relative to said latch.

9. The hitch recited in claim 5 wherein means is attached to said spaced ears on said latch to limit the swinging movement of said latch block relative to said latch.

10. The hitch recited in claim 4 wherein means is provided on said latch adapted to engage said latch block to lift it over said lug when said slidable bar is slid rearwardly.

References Cited in the file of this patent

UNITED STATES PATENTS

| | | |
|---|---|---|
| 2,366,294 | Stringer | Jan. 2, 1945 |
| 2,417,646 | Hallner | Mar. 18, 1947 |
| 2,484,751 | Schultz | Oct. 11, 1949 |
| 2,794,657 | Anderson | Jan. 4, 1957 |